Patented Apr. 23, 1929.

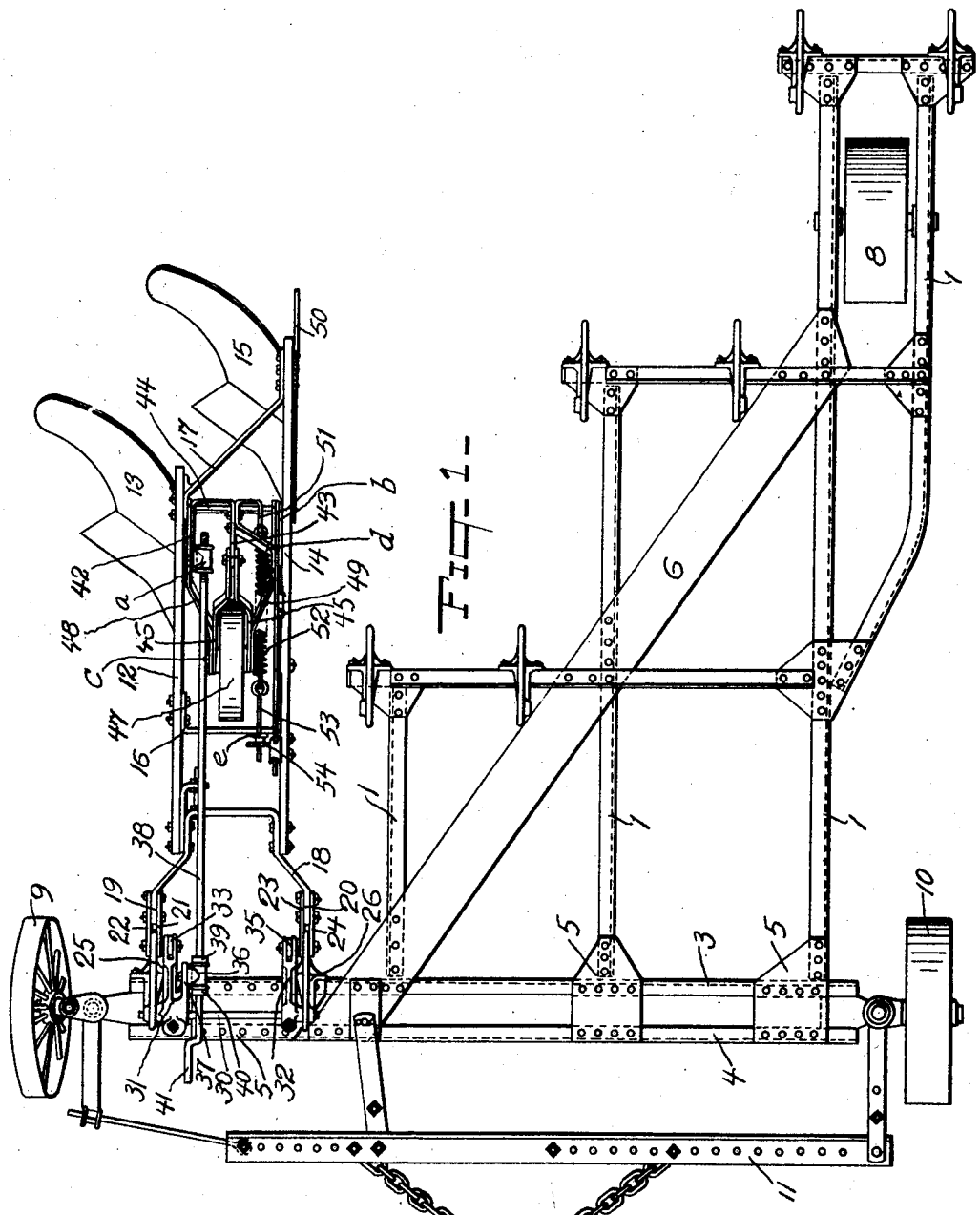

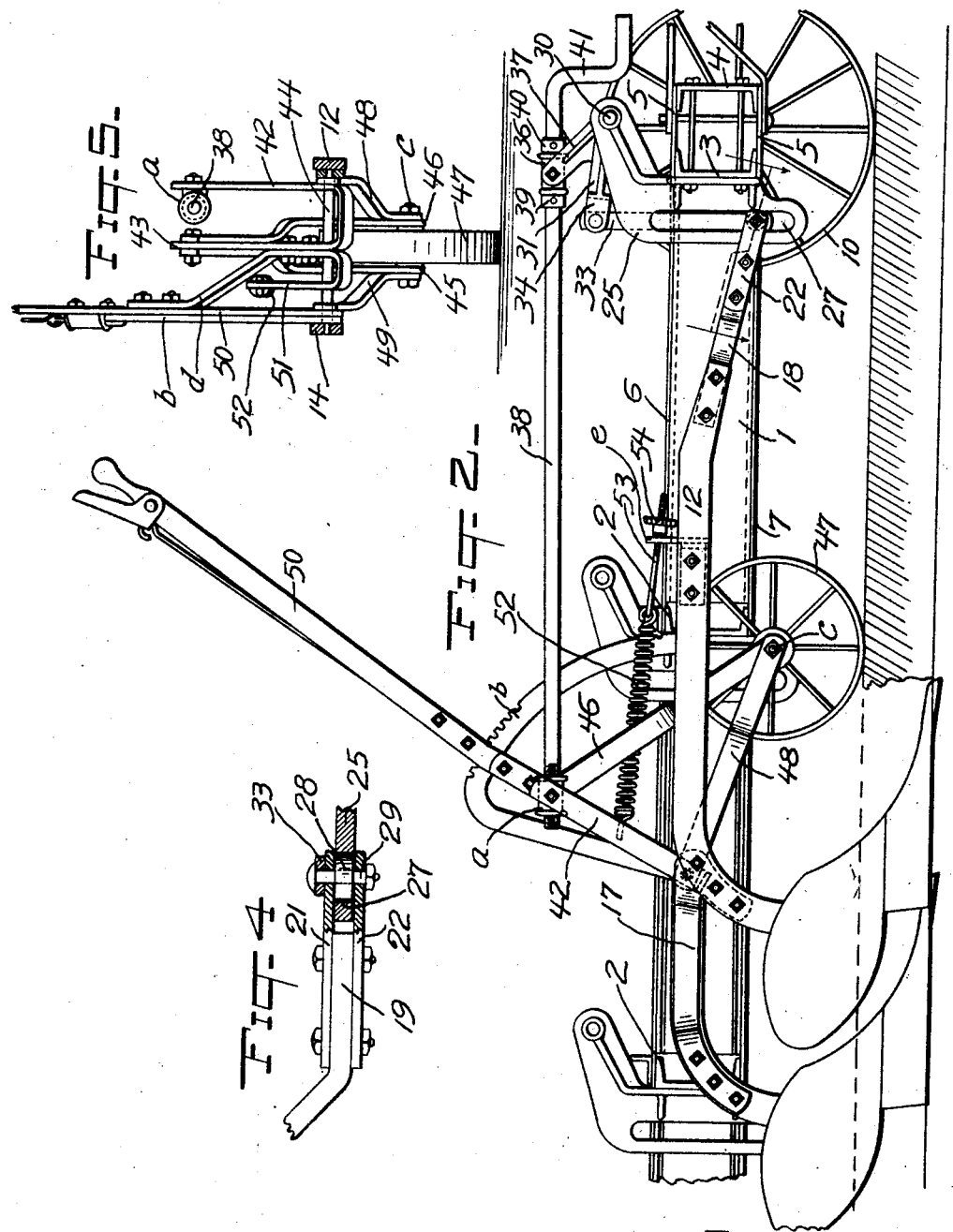

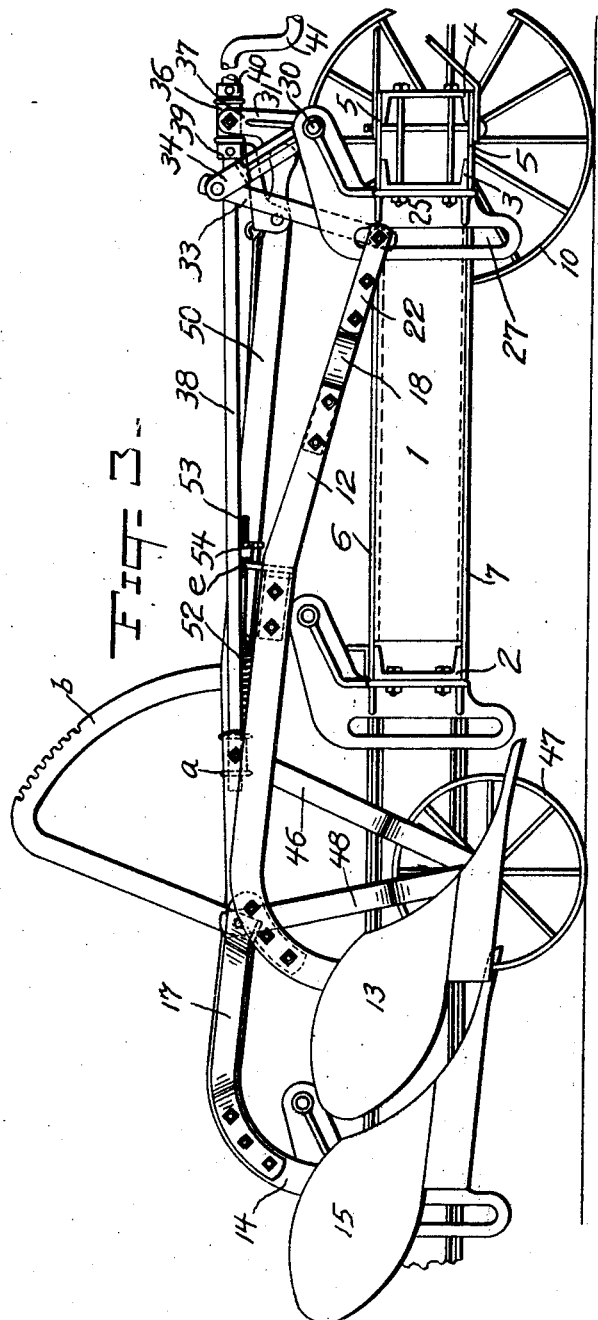

1,710,489

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

PLOW.

Application filed November 10, 1921. Serial No. 514,278.

My invention relates to plows and more particularly to certain improvements in that type of plow supported on a wheeled frame and including one or more plowing units embodying features of adjustment by which the operations of the units are controlled.

An object of my invention is to connect the units to the frame with a hitch in which the forward end of each unit is adapted to be raised or lowered simultaneously with the rear, either when the units are adjusted to vary the depth of plowing or raised entirely out of operation; also to provide means for separately adjusting vertically the front ends of the units, and to provide a construction by which the latter adjustment may be accomplished from the front of the plow or the rear of the tractor by which it is drawn. I accomplish these objects as illustrated in the drawings and as hereinafter described. What I regard as new is set forth in the claims.

Referring to the drawings in which similar numerals indicate identical parts:

Figure 1 is a plan view of a gang plow showing a frame with but one plow unit attached. Figure 2 is a furrow ward side elevation of part of Figure 1 showing the plow unit in the ground and the rear wheel and its support omitted. Figure 3 is a similar view to Figure 1 but with the plow unit raised. Figure 4 is a sectional detail view of the connection of the plow unit to the frame, and Figure 5 is a detail view taken from the rear of Figure 2.

I have shown in the drawings a frame adapted for a plurality of plowing units to be attached thereto in stepped relation, but I do not limit myself to a frame carrying a plurality of plowing units for it is obvious that my improvement may be applied to smaller types of plow in which a plowing unit is pivotally connected to a wheeled frame.

The type of plow shown includes a rigid frame composed of longitudinal parallel bars 1 bolted or riveted to transverse bars 2, visible only in Figures 2 and 3, and, at their forward ends, to a composite transverse beam formed of bars 3 and 4 spaced apart and rigidly held in parallel relation by plates 5 on both their upper and lower sides. Beams 6 and 7 extend diagonally landward of the frame and are rigidly secured thereto. Angle bars are secured to the tops of the central transverse bars 2. The rear end of the frame is supported on a wheel 8, and forwardly the frame is supported on wheels 9 and 10. The latter are dirigible in a well known manner by operation of a draft bar 11 connected therewith and also connected to a tractor 12. I thus provide a wheeled frame that is stable, i. e. has a fixed position relative to the ground.

In the type of plow shown a plurality of plowing units are carried by the frame but as all the units are alike and are operated in a similar manner, a description of one will suffice.

The unit is composed preferably of a plow beam 12, on which is secured a plow body 13, and a beam 14 carrying a plow body 15, which beams are properly spaced apart and rigidly secured together by braces 16 and 17 bolted to both beams. Bolted to the beams 12 and 14, and extending forwardly, is a yoke shaped member 18 its arms diverging from the ends of the beams 12 and 14 and terminating in parallel portions 19 and 20. To the portion 19, and on opposite sides thereof respectively are bolted forwardly extending links 21 and 22, and similar links 23 and 24 are secured to the portion 20. Draft members in the form of brackets 25 and 26 are rigidly mounted on the bar 3 of the composite beam and each is provided with a vertical slot 27. An anti-friction roller 28 operates in the slot 27 of the bracket 25 and is journaled to rotate on a bolt 29 in the forward part of the links 21 and 22 which extend on opposite sides of the bracket 25. A similar roller operates in the slot of the bracket 26 and is mounted in the same way between the forward ends of the links 23 and 24. The forward ends of the beams may thus move vertically relatively to the draft members or brackets 25, 26 without fore and aft movement.

The brackets 25 and 26 project forwardly above the composite beam and journaled in their forward ends is a rock shaft 30 having secured thereon at one end a bell crank 31 and at its opposite end an arm 32. A lifting bar 33 is pivotally connected to the arm 34 of the bell crank 31 and projects downwardly to pivotal connection with the bolt 29 in the links 21 and 22. From the arm 32 a similar lifting bar 35 extends downwardly to pivotal connection with the bolt 29 in the links 23 and 24. A sleeve 36 is pivotally supported on the arm 37 of the bell crank 31, and journaled therein is an adjusting rod 38 held from longitudinal movement in the sleeve by collars 39 and 40 secured on the rod at opposite ends of the sleeve 36 respectively; the rod 38 is adapted to be rotated by a crank 41 preferably integral therewith.

A shaft 44 is carried on the beams 12 and 14 and rockably mounted thereon is a U-shaped member on the upper end of the arm 42 of which is pivotally supported a sleeve "a" having its interior threaded for reception of the threaded rear end of the rod 38. Pivotally supported on the shaft 44 are bars 48 and 49 on the lower ends of which is mounted an axle c. A gauge wheel 47 is journaled on the axle c, and on the latter, between the bars 48 and 49 and the hub of the wheel 47, are secured bars 45 and 46 which extend upwardly to the end of the arm 43 of the U-shaped member to which they are rigidly secured. A lever 50 is pivotally mounted on the shaft 44, adjacent the beam 14, and is provided with the usual type of latch to engage with any one of the notches in a sector b secured on the shaft 44 and the beam 14. Bolted to the lever 50 is a brace d which extends to the arm 43 of the U-shaped member to which it is rigidly secured by suitable bolts. The brace d is then bent U-shaped and is pivotally mounted on the shaft 44, and to the end of its arm 51 is attached a coiled spring 52 which extends forwardly to connection with an end of a rod 53 projected through a hole in a bracket e on the brace 16; the forward portion of the rod 53 is threaded and operatively mounted thereon, forward of the bracket e is a rosette wheel 54 by the rotation of which the tension of the spring 52 is regulated.

The parts just described, pivotally supported on the shaft 44, constitute a rigid frame carrying the gauge wheel 47 and rockable by forward operation of the lever 50, connected therewith, to raise the rear of the plow unit by a downwardly and rearwardly swinging movement of said frame relative to the unit. Simultaneously the forward end of the unit is raised, without fore and aft movement thereof through the connection of the rod 38 with the arm 42 of the U-shaped member and the arm 37 of the bell crank 31, to the arm 34 to which the lifting bar 33 is connected, and as the bell-crank is rigidly mounted on the rock-shaft 30, the arm 32 is also rocked to actuate the lifting bar 35. Consequently both lifting bars operate to raise the forward end of the unit to which they are connected, the rollers 29 moving freely in the slots of the brackets 25 and 26, and ensuring a vertical guidance for the forward part of the plow. The unit is held in a raised position, as shown in Figure 3, by the latch on the lever engaging a notch in the sector b. It is evident that by rocking the lever 50 rearwardly a reverse action of the parts will occur and the unit will be lowered to operative position. The depth to which it is desired the plow shall operate is regulated by the lever 50 which is securable at varying positions by the latch thereon engaging with a notch in the sector b, and the angle to the horizontal at which the plow bodies shall operate is regulated by turning the crank handle 41 to rotate the rod 38 and diminish or increase the distance between the sleeves a and 36. This adjustment is effected independently of any disturbance of the lifting connections, so that when adjustment is made for varying the depth of plowing, the plow bottom or bottoms rise or descend horizontally. By the construction described, therefore, the hitch point may be vertically adjusted to meet different plowing conditions,—as where the soil is hard, or the plow point is dull, the operator may want to tip it down to get better penetration, or where the soil is soft he may wish to tip the point up. By my improved construction such adjustment may be made and will remain undisturbed, notwithstanding the raising or lowering of the rear portion of the plow, or adjustment of the plow bottoms for depth. Moreover, as the crank 41 is at the forward end of the structure, it may be conveniently operated to vertically adjust the hitch point from the rear of the tractor by which the plow is drawn.

As before stated the frame is a solidly built wheeled structure to which the plowing units are attached and by which they are drawn. The units, as shown, consist of two beams and plow bodies, but they may have but one beam and plow body, my improvement being adapted for use irrespective of the number of beams and plow bodies in each unit.

What I claim is—

1. In a plow, the combination with a wheel supported frame, of a plowing unit, lifting means connected with said unit and operable to raise or lower the rear portion thereof, a stationary draft member mounted on said frame, the front end portion of said unit being connected with said draft member for vertical adjustment relatively thereto, means mounted on said frame movable to raise or lower the front end of said unit relatively to said draft member, and adjustable means actuated by the lifting of the rear portion of said unit for moving the latter means to raise the front end portion of said unit, said adjustable means comprising devices operable to vary the relative range of movement of the front and rear end portions of said unit.

2. In a plow, the combination with a wheel supported frame, of a plowing unit, lifting means connected with said unit and operable to raise or lower the rear portion thereof, a stationary draft member mounted on said frame, the front end portion of said unit being connected with said draft member for vertical adjustment relatively thereto, means mounted on said frame movable, independently of the actuation of said lifting means, to raise or lower the front end of said unit relatively to said draft member, and means actuated by the lifting of the rear portion of said unit for moving the latter means to raise the front end portion of said unit.

3. In a plow, the combination with a wheel supported frame, of a plowing unit, lifting means connected with said unit and operable to raise or lower the rear portion thereof, a draft member mounted on the front portion of said frame, the front end portion of said unit being connected with said draft member for vertical adjustment, means movable from the front of the plow, to raise or lower the front end of said unit relatively to said draft member, and means actuated by the lifting of the rear portion of said unit for moving the latter means to raise the front end portion of said unit.

4. In a plow, the combination with a wheel supported frame, of a plowing unit, lifting means connected with said unit and operable to raise or lower the rear portion thereof, a draft member mounted on said frame, the front end portion of said unit being connected with said draft member for vertical adjustment, means movable from the front of the plow, independently of the actuation of said lifting means, to raise or lower the front end of said unit relatively to said draft member, and means actuated by the lifting of the rear portion of said unit for moving the latter means to raise the front end portion of said unit.

5. In a plow, the combination with a wheel supported frame, of a plowing unit, a lifting member arranged to swing longitudinally with respect to said frame and supporting the rear portion of said plowing unit, a draft member carried by said frame and having a vertically disposed guide, means connecting the forward portion of said unit with said draft member and movable along said guide, means movable to raise and lower the front end of said unit relatively to said draft member, and means actuated by movement of said lifting member to raise or lower the rear portion of the unit for vertically moving the front end thereof.

6. In a plow, the combination with a wheel supported frame, of a plowing unit, a lifting member arranged to swing longitudinally with respect to said frame and supporting the rear portion of said plowing unit, a draft member carried by said frame and having a vertically disposed guide, means connecting the forward portion of said unit with said draft member and movable along said guide, means movable to raise and lower the front end of said unit relatively to said draft member, and means actuated by movement of said lifting member to raise or lower the rear portion of the unit for vertically moving the front end thereof, the latter means comprising devices movable to raise or lower the front end of the unit independently of the actuation of said lifting member.

7. In a plow, the combination with a wheel supported frame, of a plowing unit, a lifting member arranged to swing longitudinally with respect to said frame, and supporting the rear portion of said plowing unit, a draft member carried by said frame and having a vertically disposed guide, means connecting the forward portion of said unit with said draft member and movable along said guide, means movable to raise and lower the front end of said unit relatively to said draft member, and a connection between said lifting member and the latter means for effecting simultaneous vertical movement of both ends of the plowing unit.

8. In a plow, the combination with a wheel supported frame, of a plowing unit, a ground supported lifting member arranged to swing about a transverse axis with respect to said frame and supporting the rear portion of said plowing unit, a draft member carried by said frame and having a vertically disposed guide, means connecting the forward portion of said unit with said draft member and movable along said guide, means movable to raise and lower the front end of said unit relatively to said draft member, and a connection between said lifting member and the latter means for effecting simultaneous vertical movement of both ends of the plowing unit.

9. In a plow, the combination with a wheel supported frame, of a plowing unit, a ground supported lifting member arranged to swing about a transverse axis with respect to said frame and supporting the rear portion of said plowing unit, a draft member carried by said frame and having a vertically disposed guide, means connecting the forward portion of said unit with said draft member and movable along said guide, means movable to raise and lower the front end of said unit relatively to said draft member, and a connection between said lifting member and the latter means for effecting simultaneous vertical movement of both ends of the plowing unit, said connection comprising means operable to separately adjust the front end of said unit vertically.

10. In a plow, the combination with a wheel supported frame, of a plowing unit, a lifting member arranged to swing longitudinally with respect to said frame and supporting the rear portion of said plowing unit, a draft member carried by said frame and having a vertically disposed guide, means connecting the forward portion of said unit with said draft member and movable along said guide, a fore and aft swinging bell-crank supported by said frame and connected with the front end portion of said unit, and a rod operatively connecting said bell-crank with said lifting member, whereby actuation of said lifting member will move the front end portion of said unit correspondingly with the rear portion thereof.

11. In a plow, the combination with a wheel supported frame, of a plowing unit, a lifting member arranged to swing longitudinally with respect to said frame and supporting the rear portion of said plowing unit, a draft member carried by said frame and having a vertically disposed guide, means connecting the forward portion of said unit with said draft member and movable along said guide, a fore and aft swinging bell-crank supported by said frame and connected with the front end portion of said unit, and a rod operatively connecting said bell-crank with said lifting member, whereby actuation of said lifting member will move the front end portion of said unit correspondingly with the rear portion thereof, said rod being operable independently of said lifting member, to actuate said bell crank to vertically adjust the front portion of said unit.

12. In a plow, the combination with a wheel supported frame, of a plowing unit, a lifting member arranged to swing longitudinally with respect to said frame and supporting the rear portion of said plowing unit, a draft member carried by said frame and having a vertically disposed guide, means connecting the forward portion of said unit with said draft member and movable along said guide, a fore and aft swinging bell-crank supported by said frame and connected with the front end portion of said unit, and a rod operatively connecting said bell-crank with said lifting member, whereby actuation of said lifting member will move the front end portion of said unit correspondingly with the rear portion thereof, said rod having a screw threaded connection with said lifting member, whereby the front portion of said unit may be vertically adjusted independently of actuation of said lifting member.

13. In a plow, the combination with a wheel supported frame, a lifting member arranged to swing longitudinally of the frame, a lever for actuating said lifting member, and means for locking said lever in its different positions of adjustment, of a plowing unit having its rear portion connected with said lifting member, a draft member mounted on said frame, said draft member having a vertical guide, means connecting the front portion of said unit with said draft member and movable along said guide, movable means connected with the front portion of the unit and operable to move the same up or down along said guide, and means connecting said lifting member with said movable means, whereby said movable means may be actuated by the operation of said lifting member.

14. In a plow, the combination with a wheel supported frame, a lifting member arranged to swing longitudinally of the frame, a lever for actuating said lifting member, and means for locking said lever in its different positions of adjustment, of a plowing unit having its rear portion connected with said lifting member, a draft member mounted on said frame, said draft member having a vertical guide, means connecting the front portion of said unit with said draft member and movable along said guide, movable means connected with the front portion of the unit and operable to move the same up or down along said guide, and means connecting said lifting member with said movable means, whereby said movable means may be actuated by the operation of said lifting member, said connecting means being operable independently of said lifting member to raise or lower the front portion of the unit.

15. In a plow, the combination with a stable wheeled frame, a bracket mounted on the frame, and a vertical slot in said bracket, of a plowing unit having its forward end connected with said bracket to move along said slot, rockable means supported on the frame and connected with the forward portion of said unit to move the same vertically, a wheeled lifting element supporting said unit and rockable to raise or lower the rear thereof, and means connecting said lifting element and said rockable means for simultaneous operation to raise or lower both ends of said unit simultaneously, said rockable means being operable independently of said lifting element to raise or lower the front end of the unit.

16. In a plow, the combination with a stable wheeled frame, brackets mounted on the frame, a vertical slot in each bracket, plowing units having their forward ends connected to the brackets by transverse pivots, rockable means supported on the frame and coupled to said pivots and operable to raise or lower the forward ends of said units, a wheeled lifting element supporting each of said units and rockable to raise or lower the rear thereof, and means connecting said lifting element and said pivots for simultaneous operation to raise or lower both ends of each unit simultaneously.

17. In a plow, the combination with a stable frame, brackets mounted on the frame, a vertical slot in each bracket, plowing units having their forward ends connected to the brackets by transverse pivots, rockable means supported on the frame and coupled to said pivots and operable to raise or lower the forward ends of said units, a wheeled lifting element supporting each of said units and rockable to raise or lower the rear thereof, and means connecting said lifting element and said pivots for simultaneous operation to raise or lower both ends of each unit simultaneously, said rockable means being operable independently of said lifting element to raise or lower the front ends of said units.

WILLIAM L. PAUL.